United States Patent
Pan et al.

(10) Patent No.: US 11,068,721 B2
(45) Date of Patent: Jul. 20, 2021

(54) AUTOMATED OBJECT TRACKING IN A VIDEO FEED USING MACHINE LEARNING

(71) Applicant: THE BOEING COMPANY, Chicago, IL (US)

(72) Inventors: Jan Wei Pan, Madison, AL (US); Hieu Tat Nguyen, Madison, AL (US); Zachary Jorgensen, Owens Cross Roads, AL (US); Yuri Levchuk, Potomac, MD (US)

(73) Assignee: THE BOEING COMPANY, Chicago, IL (US)

( * ) Notice: Subject to any disclaimer, the term of this patent is extended or adjusted under 35 U.S.C. 154(b) by 660 days.

(21) Appl. No.: 15/474,275

(22) Filed: Mar. 30, 2017

(65) Prior Publication Data

US 2018/0285648 A1 Oct. 4, 2018

(51) Int. Cl.
  *G06K 9/00* (2006.01)
  *G06T 7/246* (2017.01)
  *G06T 7/73* (2017.01)

(52) U.S. Cl.
  CPC .......... *G06K 9/00744* (2013.01); *G06T 7/248* (2017.01); *G06T 7/73* (2017.01); *G06T 2207/10016* (2013.01); *G06T 2207/20081* (2013.01); *G06T 2207/30232* (2013.01); *G06T 2207/30241* (2013.01)

(58) Field of Classification Search
  CPC .................. G06K 9/00744; G06T 7/73; G06T 2207/20081; G06T 2207/10016
  See application file for complete search history.

(56) References Cited

U.S. PATENT DOCUMENTS

| 6,263,088 B1 * | 7/2001 | Crabtree | G01S 3/7865 |
| | | | 348/169 |
| 6,295,367 B1 * | 9/2001 | Crabtree | G01S 3/7865 |
| | | | 382/103 |
| 9,846,810 B2 * | 12/2017 | Partis | G06K 9/00771 |

(Continued)

OTHER PUBLICATIONS

Torralba et al., Sharing features: efficient boosting procedures for multiclass object detection, 2004, Proceedings of the 2004 IEEE Computer Society Conference on Computer Vision and Pattern Recognition (CVPR'04), pp. 1-8. (Year: 2004).*

(Continued)

*Primary Examiner* — Brenda C Bernardi
(74) *Attorney, Agent, or Firm* — Womble Bond Dickinson (US) LLP

(57) ABSTRACT

An apparatus is provided for automated object tracking in a video feed. The apparatus receives and sequentially processes a plurality of frames of the video feed to track objects. In particular, a plurality of objects in a frame are detected and assigned to a respective track fragment. A kinematic, visual, temporal or machine learning-based feature of an object is then identified and stored in metadata associated with the track fragment. A track fragment for the object is identified in earlier frames based on a comparison of the feature and a corresponding feature in metadata associated with the earlier frames. The track fragments for the object in the frame and the object in the earlier frames are linked to form a track of the object. The apparatus then outputs the video feed with the track of the object as an overlay thereon.

21 Claims, 5 Drawing Sheets

(56) References Cited

U.S. PATENT DOCUMENTS

| | | | |
|---|---|---|---|
| 2004/0156530 A1* | 8/2004 | Brodsky | G06K 9/32 382/103 |
| 2005/0104727 A1* | 5/2005 | Han | G06K 9/00335 340/541 |
| 2005/0104959 A1* | 5/2005 | Han | G08B 13/19604 348/143 |
| 2005/0104960 A1* | 5/2005 | Han | G06K 9/00335 348/143 |
| 2005/0104961 A1* | 5/2005 | Han | G08B 13/19604 348/143 |
| 2005/0105765 A1* | 5/2005 | Han | G06K 9/00295 382/100 |
| 2005/0265581 A1* | 12/2005 | Porter | G06K 9/00295 382/103 |
| 2005/0265603 A1* | 12/2005 | Porter | G06K 9/00248 382/190 |
| 2007/0133840 A1 | 6/2007 | Cilia | |
| 2008/0101652 A1* | 5/2008 | Zhao | G06K 9/00369 382/103 |
| 2009/0002489 A1* | 1/2009 | Yang | G06K 9/00771 348/143 |
| 2009/0141933 A1* | 6/2009 | Wagg | G06K 9/00348 382/100 |
| 2011/0052003 A1* | 3/2011 | Cobb | G06K 9/00771 382/103 |
| 2011/0091117 A1* | 4/2011 | Sakamoto | G06K 9/4609 382/218 |
| 2011/0222727 A1* | 9/2011 | Sharma | G06T 7/246 382/103 |
| 2012/0046044 A1* | 2/2012 | Jamtgaard | H04W 4/029 455/456.1 |
| 2012/0251078 A1* | 10/2012 | Leichter | G06K 9/00295 386/278 |
| 2014/0347475 A1* | 11/2014 | Divakaran | G06K 9/00771 348/135 |
| 2015/0016671 A1 | 1/2015 | Adachi | |
| 2015/0104066 A1 | 4/2015 | Shellshear | |
| 2015/0178564 A1* | 6/2015 | Yokono | G06K 9/00382 382/159 |
| 2015/0189191 A1* | 7/2015 | Cucco | H04N 5/265 348/659 |
| 2016/0139977 A1* | 5/2016 | Ashani | G06F 11/0706 714/26 |
| 2016/0343146 A1* | 11/2016 | Brown | G06K 9/481 |
| 2017/0039451 A1* | 2/2017 | Hosoi | G06N 20/00 |
| 2017/0061241 A1* | 3/2017 | Rastgar | G06K 9/52 |
| 2017/0068861 A1* | 3/2017 | Miller | G06K 9/00771 |
| 2017/0091952 A1* | 3/2017 | Sun | G06T 5/10 |
| 2018/0137892 A1* | 5/2018 | Ding | G11B 27/11 |
| 2018/0144439 A1* | 5/2018 | Stepanenko | G06T 3/0062 |

OTHER PUBLICATIONS

L.J. van der Merwe et al., "Track-Stitching Using Graphical Models and Message Passing", University of Pretoria, South Africa, pp. 1-7.

Extended European Search Report, EP 18 15 6549, dated Jul. 25, 2018.

European Office Action dated Oct. 1, 2020 in the corresponding European Application No. 18156549.0.

* cited by examiner

AUTOMATED OBJECT TRACKING IN A VIDEO FEED USING MACHINE LEARNING

TECHNOLOGICAL FIELD

The present disclosure relates generally to object tracking and, in particular, to performing object association and matching for tracking objects within a video feed using machine learning.

BACKGROUND

Currently, there is an increasing demand for more sophisticated video tracking systems. This demand is primarily motivated by organizations looking to use videos to not only enhance security capabilities, but also to increase situational awareness for improving their business operations through applications such as workflow analysis, traffic monitoring, and crowd and object detection. For example, retailers and customer-facing branch network operators utilize insights from videos to optimize their operations and better understand customer behaviors. In another example, airports, train stations and other mass transit operators monitor videos to facilitate human traffic flow, detect operational incidents, and use predictive modeling to optimize their operations.

With this rapid increase in the installation of video surveillance systems, existing teams of operators for surveillance systems are unable to efficiently process and maintain the vast quantity of video data that is being generated, which may lead to a substantial amount of unseen video footage. As a result, most video surveillance installations are only used for forensic and evidential purposes after the fact. To enhance insights relevant to video surveillance footage, human analysts are heavily utilized to monitor videos for activities such as suspicious behavior, object recognition, traffic monitoring, incident detection, face matching, safety alerts, anomaly detection, and crowd counting. However, this technique is inefficient and error prone.

Therefore, it may be desirable to have a system and method that take into account at least some of the issues discussed above, as well as possibly other issues.

BRIEF SUMMARY

Example implementations of the present disclosure are directed to an improved apparatus, method and computer-readable storage medium for automated object tracking in a video feed. In some example implementations, a method is provided for automated object tracking in a video feed using machine learning. The method comprises receiving a video feed that includes a plurality of frames. The method also includes using machine learning techniques and sequentially processing each frame of the plurality of frames to track a plurality of objects in the frames. For each object of the plurality of objects, the method includes transforming the track of the object to a common frame of reference to generate a common reference frame having the tracks of the plurality of objects mapped thereto. The method also includes outputting the video feed with the common reference frame and the mapped tracks of the plurality of objects as an overlay thereon.

Sequentially processing each frame of the plurality of frame includes detecting a plurality of objects in the frame, and for each object of the plurality of object, assigning the object to a track fragment for the object in the frame. The plurality of objects are detected and assigned using computer vision, machine learning, and a catalog of kinematic, visual, temporal or machine learning-based features of identifiable objects. Sequentially processing each frame also includes identifying a kinematic, visual, temporal or machine learning-based feature of the object, and storing the kinematic, visual, temporal or machine learning-based feature in metadata associated with the track fragment to which the object is assigned. Further, for at least some of the plurality of frames, sequentially processing each frame includes identifying a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames. Sequentially processing each frame also includes linking the track fragment for the object in the frame and the track fragment for the object in the one or more earlier frames to form a longer track fragment that is a track of the object.

In some example implementations of the method of the preceding or any subsequent example implementation, or any combination thereof, identifying the track fragment for the object in the one or more earlier frames includes identifying the track fragment in an instance in which the statistical variance between the kinematic, visual, temporal or machine learning-based feature and the corresponding kinematic, visual, temporal or machine learning-based feature is below a predetermined threshold.

In some example implementations of the method of any preceding or any subsequent example implementation, or any combination thereof, the method further comprises maintaining a database of active track fragments including the track fragment for any object detected in the frame or in an earlier frame within a threshold number of frames, and a database of suspended track fragments including the track fragment for any object not detected in the frame or in an earlier frame within the threshold number of frames. In these example implementations, identifying the track fragment for the object in the one or more earlier frames includes searching the database of active track fragments or the database of suspended track fragments to identify the track fragment for the object within the track fragments maintained therein.

In some example implementations of the method of any preceding or any subsequent example implementation, or any combination thereof, in an instance in which the track fragment for the object in the one or more earlier frames is identified in the database of suspended track fragments, identifying the track fragment for the object in the one or more earlier frames further includes moving the track fragment for the object in the one or more earlier frames from the database of suspended track fragments to the database of active track fragments. The track fragment for any object not detected in the frame or in an earlier frame within a second threshold number of frames is deleted from the database of suspended track fragments.

In some example implementations of the method of any preceding or any subsequent example implementation, or any combination thereof, sequentially processing each frame of the plurality of frames further includes assigning a unique identifier to the object in a first instance in which the object is detected. In these example implementations, identifying the kinematic, visual, temporal or machine learning-based feature of the object includes associating the kinematic, visual, temporal or machine learning-based feature with the unique identifier in the metadata associated with the track fragment to which the object is assigned. Further in these example implementations, outputting the video feed includes generating corresponding workflow analytics for an object in the video feed in which the workflow analytics are associated with the unique identifier of the object.

In some example implementations of the method of any preceding or any subsequent example implementation, or any combination thereof, the video feed includes a plurality of video feeds, and receiving the video feed and sequentially processing each frame of the plurality of video frames includes receiving the video feed and sequentially processing each frame of the plurality of video frames for each of at least a first video feed and a second video feed. In these example implementations, in response to at least one object being detected in a frame of the first video feed and a frame of the second video feed, the method further comprising linking the track fragment for the object in the frame of the first video feed and the track fragment for the object in the frame of the second video feed.

In some example implementations of the method of any preceding or any subsequent example implementation, or any combination thereof, at least one frame of the plurality of frames includes an occlusion, and detecting the plurality of objects in the frame includes detecting at least one occluded object of the plurality of objects, and assigning the occluded object to a track fragment using computer vision, machine learning, and the catalog of kinematic, visual, temporal or machine learning-based features of identifiable objects.

In some example implementations, an apparatus is provided for automated object tracking in a live video feed. The apparatus comprises a processor and a memory storing executable instructions that, in response to execution by the processor, cause the apparatus to implement a number of subsystems, such as a receiver, object detector, and object tracker that are configured to at least perform the method of any preceding example implementation, or any combination thereof.

In some example implementations, a computer-readable storage medium is provided for automated object tracking in a live video feed. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
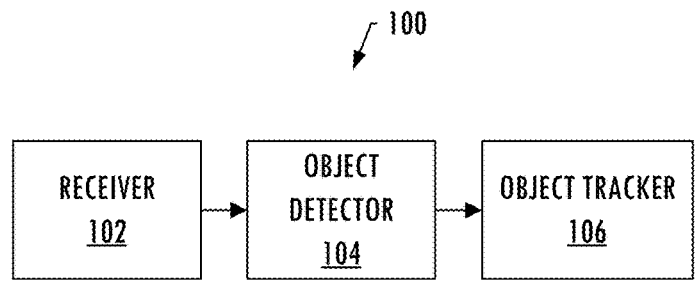
FIG. 1 is an illustration of a system for automated object tracking in a video feed, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more, if not all, of these may be absolute or approximate to account for acceptable variations that may occur, such as those due to engineering tolerances or the like Like reference numerals refer to like elements throughout.

Example implementations of the present disclosure are generally directed to object and activity tracking and, in particular, to performing object association and matching for tracking objects within a video feed. Example implementations will be primarily described in conjunction with applications for video surveillance and analytic systems. It should be understood, however, that example implementations may be utilized in conjunction with a variety of other applications, such as other applications within the aerospace industry and outside of the aerospace industry.

Example implementations of the present disclosure are more particularly directed to a system configured to receive a video feed (e.g., via a video camera), and trained to automatically recognize various objects and activities present in the video feed, using a combination of computer vision, natural language processing, and machine learning models. The system is also configured to track objects based on their kinematic, visual, temporal and machine learning-based features.

FIG. 1 illustrates a system 100 for automated object tracking in a video feed, which may simply be referred to as the "system" herein. The system is configured to perform a number of different functions or operations, either automatically, under direct operator control, or some combination of thereof. In some examples, the system is configured to perform one or more of its functions or operations automatically, that is, without being directly controlled by an operator. Additionally or alternatively, in some examples, the system is configured to perform one or more of its functions or operations under direct operator control.

In accordance with example implementations of the present disclosure, the system 100 is configured to perform various functions or operations to track objects within a video feed (e.g., a live video feed or recorded video). In some example implementations, the system is configured to receive a video feed including a plurality of frames, sequentially process each frame of the plurality of frames to track a plurality of objects therein and output the video feed with tracks of respective objects of the plurality of objects as an overlay thereon in which the tracks are mapped to a common reference frame. In these example implementations, the system is configured to detect a plurality of objects in a frame and, for each object of the plurality of objects, assign the object to a track fragment for the object in the frame. The plurality of objects are detected and assigned using computer vision, machine learning, and a catalog of kinematic, visual, temporal or machine learning-based features of identifiable objects. The system is then configured to identify a kinematic, visual, temporal or machine learning-based feature of the object, and store the kinematic, visual, temporal or machine learning-based feature in metadata associated with the track fragment to which the object is assigned.

Further for at least some of the plurality of frames, the system is configured to identify a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames. The system is then configured to link the track fragment for the object in the frame and the track fragment for the object in the one or more earlier frames to form a longer track fragment that is a track of the object. Further, for each object of the plurality of objects, the system is configured to transform the track of the object to a common frame of reference to generate a common reference frame having the tracks of the plurality of objects mapped thereto. The system is then configured to output the video feed with the common reference frame and the mapped tracks of the plurality of objects as an overlay thereon.

The system 100 may include one or more of each of a number of different subsystems (each an individual system) coupled to one another for performing one or more functions or operations. As shown in FIG. 1, in some examples, the system includes a receiver 102, object detector 104, and object tracker 106 coupled to one another. Although shown as part of the system, the receiver, object detector or object tracker may instead be separate from but in communication with the system. It should also be understood that either of the subsystems may function or operate as a separate system without regard to others of the subsystems. And further, it should be understood that the system may include one or more additional or alternative subsystems than those shown in FIG. 1.

As explained in greater detail below, the receiver 102, object detector 104 and object tracker 106 are configured to perform respective functions or operations of the system 100. In some implementations, the receiver is configured to receive a video feed including a plurality of frames. In some implementations, the video feed includes a plurality of video feeds. In some examples, a user specifies the source of the video for receipt by either a live stream link or a video file. The receiver functions as an initial processing unit, which receives a live video stream or video file as input and splits the video into a plurality of individual image frames. An example of a suitable receiver is disclosed in U.S. patent application Ser. No. 15/374,463 to Pan et al., which is incorporated herein by reference.

The object detector 104 and object tracker 106 are configured to sequentially process each frame of the plurality of frames. The object detector detects an object in the frame, and the object tracker assigns the object to a track fragment for the object in the frame. The video feed is initially processed using computer vision, natural language processing and machine learning, and a catalog of identifiable objects. That is, objects may be detected and assigned to respective tracks using computer vision, machine learning, and a catalog of identifiable objects (e.g., a catalog of kinematic, visual, temporal or machine learning-based features of identifiable objects). Using an expanded set of features (e.g., kinematic, visual, temporal and machine-learning based features) yields improved tracking performances against occlusions and occasional detection failures. For example, in some examples, at least one frame of the plurality of frames includes an occlusion, and the object detector is configured to detect at least one occluded object of the plurality of objects, and assign the occluded object to a track fragment using computer vision, machine learning, and the catalog of kinematic, visual, temporal or machine learning-based features of identifiable objects. In some examples, a one-time training process is applied to the object detector and object tracker before they are utilized. Examples of a suitable training process are disclosed in U.S. patent application Ser. No. 15/374,463 to Pan et al., which is incorporated herein by reference.

Figure 2A:
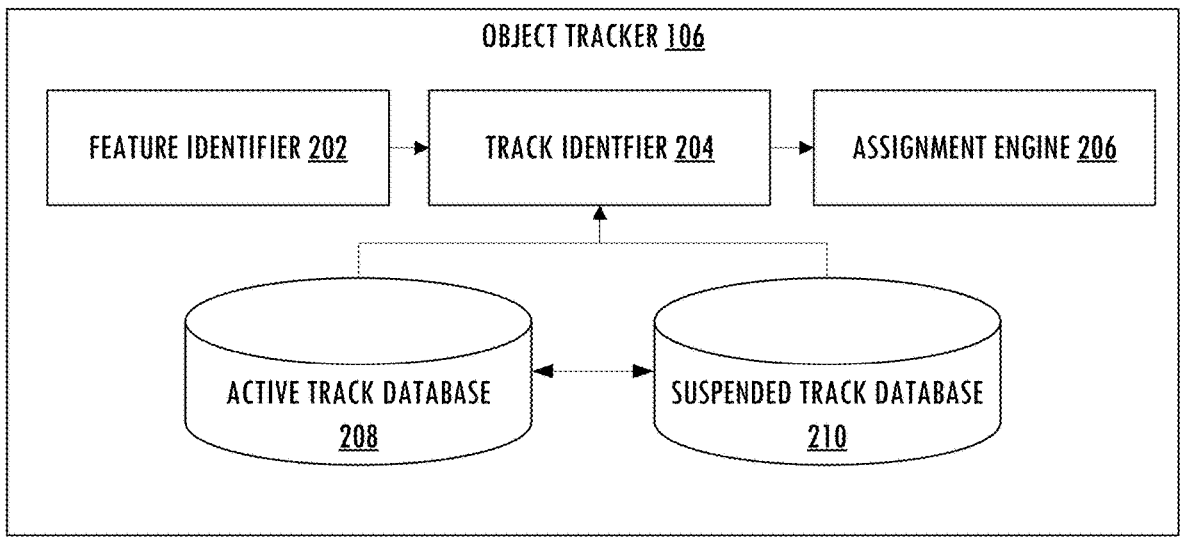
FIG. 2A illustrates a suitable object tracker of the system of FIG. 1, according to some example implementations.

FIG. 2A more particularly illustrates the object tracker 106 according to some example implementations. As shown, in some implementations, the object detector includes a feature identifier 202, track identifier 204, assignment engine 206, active track database 208, and suspended track database 210 coupled to one another to perform one or more functions or operations to process and analyze the video feed.

Figure 2B:
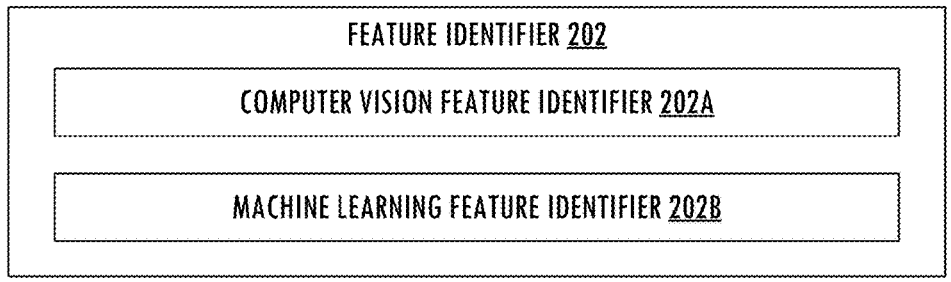
FIG. 2B illustrates a suitable feature identifier of the object tracker of FIG. 2A, according to some example implementations.

The feature identifier 202 is configured to identify a kinematic, visual, temporal or machine learning-based feature of the object, and store the kinematic, visual, temporal or machine learning-based feature in metadata associated with the track fragment to which the object is assigned. In some examples, the feature identifier is configured to identify the kinematic, visual, temporal or machine learning-based feature of the object using computer vision, machine learning, and a catalog of kinematic, visual, temporal or machine learning-based features of identifiable objects. As shown in FIG. 2B, the feature identifier may include a computer vision feature identifier 202A and a machine learning feature identifier 202B. In some implementations, the computer vision feature identifier 202A is configured to identify traditional features such as shapes, colors, and the like. In some implementations, the machine learning feature identifier 202B is trained by machine learning techniques, such as deep learning neural networks or other suitable methods, to automatically detect features of objects. For example, robust detection and classification results from deep learning neural networks provide high-level features, such as recognized semantic concepts and feature maps, to perform entity association and matching. For training purposes, the system is configured to maintain the catalog of kinematic, visual, temporal or machine learning-based features of identifiable objects using the machine learning. This may include, for example, updating the corresponding objects in the catalog with the kinematic, visual, temporal or machine learning-based features of at least some of the identifiable objects. In some examples, the computer vision and machine learning feature identifiers 202A, 202B are operatively coupled and configured to map features therebetween using a correspondence and/or transfer learning process to build a robust classification process that is adaptable for feature identification within a plurality of environments (e.g., different lighting environments, weather conditions and the like).

In some example implementations, in sequentially processing each frame of the plurality of frames, the object detector 104 is configured to further assign a unique identifier to the object in a first instance in which the object is detected. Upon identifying the kinematic, visual, temporal or machine learning-based feature of the object, the feature identifier 202 is then configured to associate the kinematic, visual, temporal or machine learning-based feature with the unique identifier in the metadata associated with the track fragment to which the object is assigned.

For at least some of the plurality of frames, the track identifier 204 is configured to identify a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames. In some examples, the track identifier is configured to identify the track fragment for the object in an instance in which the statistical variance between the kinematic, visual, temporal or machine learning-based feature and the corresponding kinematic, visual, temporal or machine learning-based feature is below a predetermined threshold.

In some examples, the object tracker 106 is configured to maintain a database 208 of active track fragments including the track fragment for any object detected in the frame or in an earlier frame within a threshold number of frames, and a database 210 of suspended track fragments including the track fragment for any object not detected in the frame or in an earlier frame within the threshold number of frames. In these examples, the track identifier 204 is configured to identify the track fragment for the object in the one or more earlier frames by searching the database of active track fragments or the database of suspended track fragments to identify the track fragment for the object within the track fragments maintained therein.

In these examples, in an instance in which the track fragment for the object in the one or more earlier frames is identified in the database 210 of suspended track fragments, the track identifier 204 is further configured to move the track fragment for the object in the one or more earlier frames from the database 210 of suspended track fragments to the database 208 of active track fragments. Further in these examples, the track fragment for any object not detected in the frame or in an earlier frame within a second threshold number of frames is deleted from the database 210 of suspended track fragments.

The assignment engine 206 is configured to link the track fragment for the object in the frame and the track fragment for the object in the one or more earlier frames to form a longer track fragment that is a track of the object. In some examples, the video feed includes a plurality of video feeds, and the object detector 104 and object tracker 106 are configured to sequentially process each frame of the plurality of video frames for each of at least a first video feed and a second video feed, and when at least one object is detected in a frame of the first video feed and a frame of the second video feed, the assignment engine is configured to link the track fragment for the object in the frame of the first video feed to the object in the frame of the second video feed.

After tracking an object, the object tracker 106 is configured to transform the track of the object to a common frame of reference to generate a common reference frame having the tracks of the plurality of objects mapped thereto. The object tracker is also configured to output the video feed with the common reference frame and the mapped tracks of the plurality of objects as an overlay thereon. In some examples, outputting the video feed also includes generating corresponding process and/or workflow analytics for an object in the video feed. For example, in some implementations the object tracker further measures and displays information (e.g., traffic flow, dwelling time, heat maps and the like) about the stationary and/or moving times of tracked objects. In some implementations, workflow analytics are associated with the unique identifier of the object.

Figure 3:
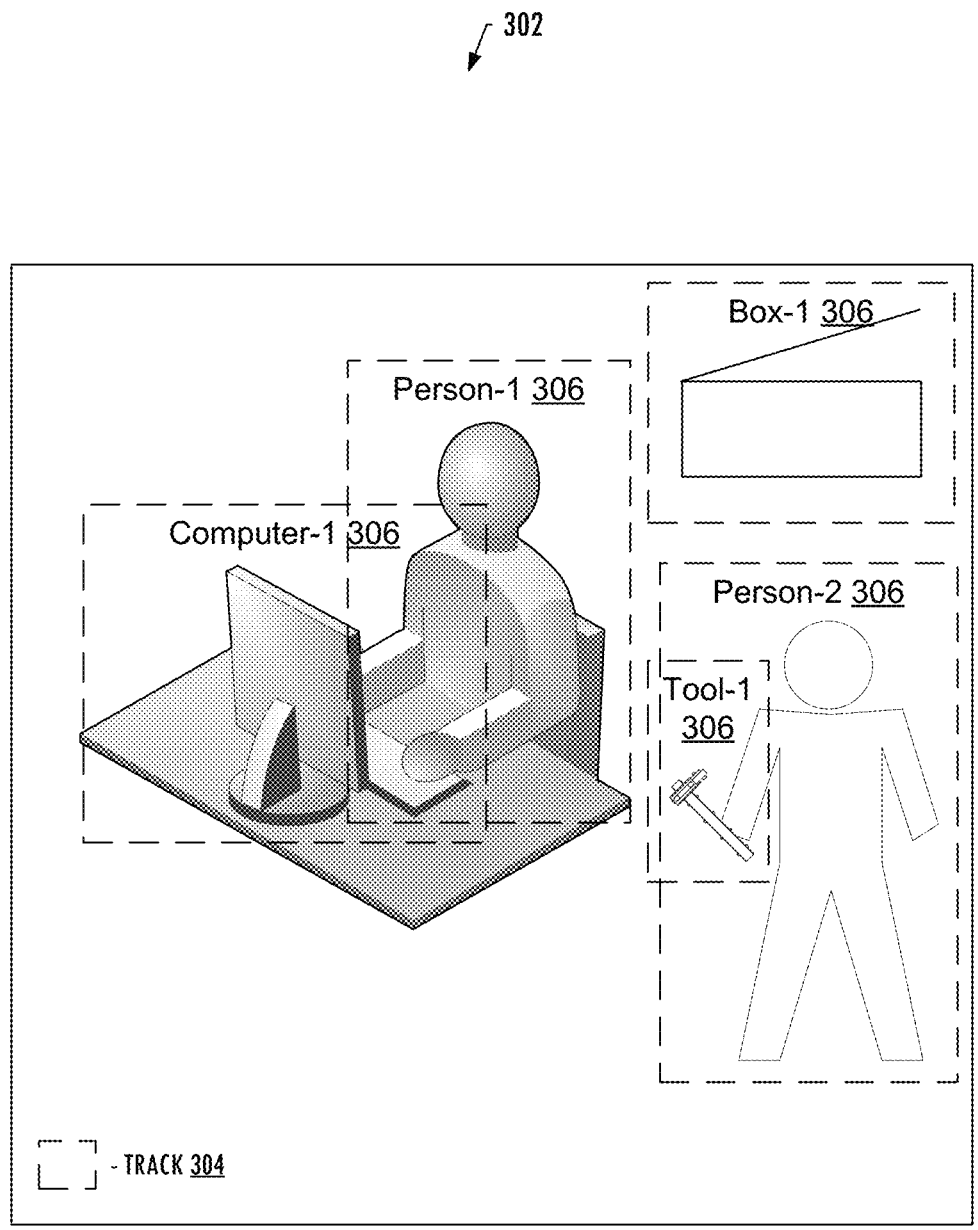
FIG. 3 illustrates a suitable video feed and corresponding track overlays, according to some example implementations.

FIG. 3 illustrates an example frame of a video feed 302 with a track 304 of an object as an overlay thereon. As shown, the video feed may have a plurality of tracks as an overlay in which each object having the respective unique identifier 306 displayed therewith. For example, in some implementations, the track is embodied by a bounding box over the object that moves along with the object across the frames of the video.

Figure 4A:
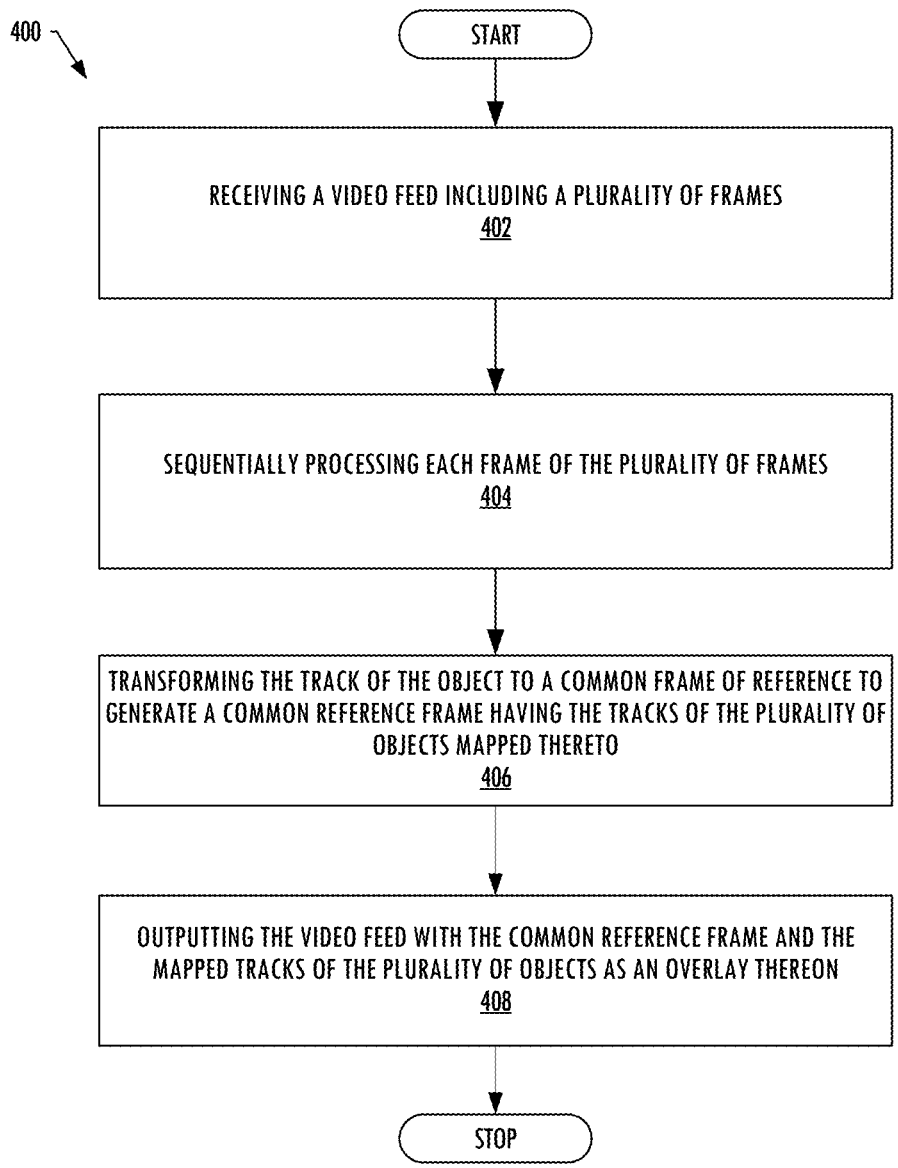
FIGS. 4A and 4B are flow diagrams illustrating various operations of a method for automated object tracking in a video feed, in accordance with an example implementation.

FIG. 4A illustrates a flowchart including various operations of a method 400 for automated object tracking in a video feed. As shown at block 402, the method includes receiving a video feed including a plurality of frames. The method also includes sequentially processing each frame of the plurality of frames, as shown in block 404. As shown at block 406, the method also includes transforming the track of the object to a common frame of reference to generate a common reference frame having the tracks of the plurality of objects mapped thereto. The method also includes outputting the video feed with the common reference frame and the mapped tracks of the plurality of objects as an overlay thereon, as shown in block 408.

Figure 4B:
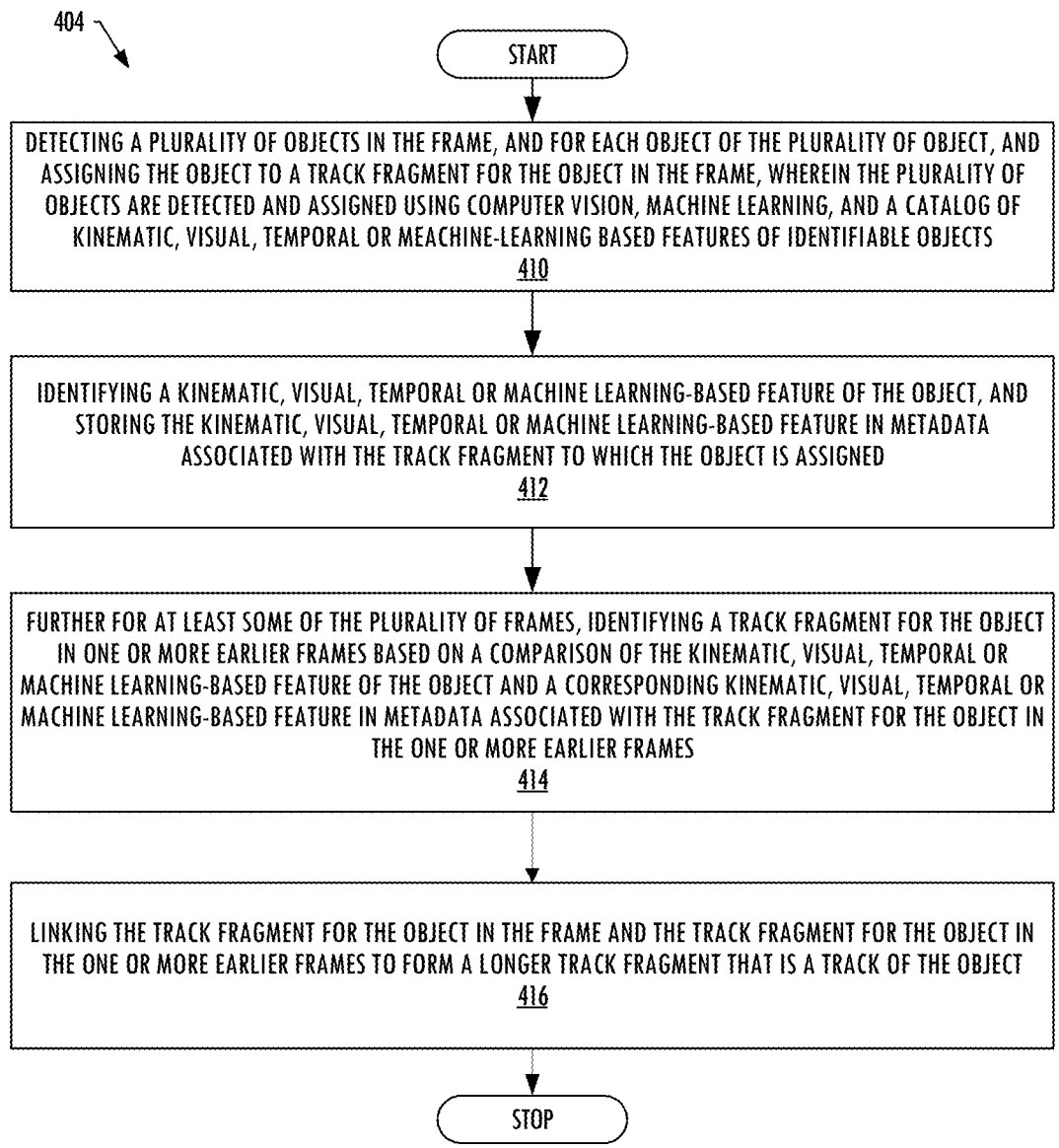

FIG. 4B is a flowchart more particularly illustrating various operations of sequentially processing each frame of the plurality of frames (block 404), according to some example implementations. Sequentially processing each frame of the plurality of frame includes detecting an object in the frame, and assigning the object to a track fragment for the object in the frame, as shown in block 410. The plurality of objects are detected and assigned using computer vision, machine learning, and a catalog of kinematic, visual, temporal or machine learning-based features of identifiable objects. Sequentially processing each frame also includes identifying a kinematic, visual, temporal or machine learning-based feature of the object, and storing the kinematic, visual, temporal or machine learning-based feature in metadata associated with the track fragment to which the object is assigned, as shown in block 412.

Further for at least some of the plurality of frames, the sequentially processing the frame includes identifying a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames, as shown in block 414. As shown in block 416, the process includes linking the track fragment for the object in the frame and the track fragment for the object in the one or more earlier frames to form a longer track fragment that is a track of the object.

According to some example implementations of the present disclosure, the system 100 and its subsystems and/or components including the receiver 102, object detector 104 and object tracker 106 may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 5:
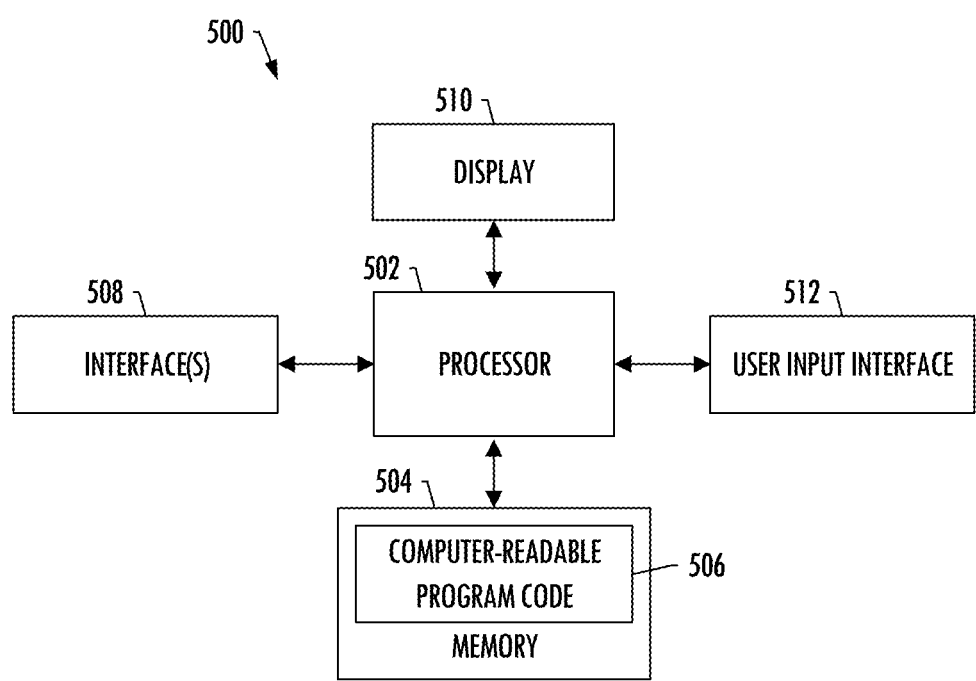
FIG. 5 illustrates an apparatus according to some example implementations.

FIG. 5 illustrates an apparatus 500 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 502 (e.g., processor unit) connected to a memory 504 (e.g., storage device).

The processor 502 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 504 (of the same or another apparatus).

The processor 502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces 508 for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 510 and/or one or more user input interfaces 512 (e.g., input/output unit). The display may be configured to present or otherwise display information to a user, suitable examples of which include a liquid crystal display (LCD), light-emitting diode display (LED), plasma display panel (PDP) or the like.

The user input interfaces 512 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 502 and a computer-readable storage medium or memory 504 coupled to the processor, where the processor is configured to execute computer-readable program code 506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automated object tracking in a video feed, the method comprising:
    receiving a video feed including a plurality of frames;
    sequentially processing each frame of the plurality of frames, including at least:
        detecting a plurality of objects in the frame, and for each object of the plurality of objects, assigning the object to a track fragment for the object in the frame, wherein the plurality of objects are detected and assigned using computer vision, machine learning, and a catalog of kinematic, visual, temporal or machine learning-based features of identifiable objects; and
        identifying a kinematic, visual, temporal or machine learning-based feature of the object, and storing the kinematic, visual, temporal or machine learning-based feature in metadata associated with the track fragment to which the object is assigned; and further for at least some of the plurality of frames,
        identifying a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames; and
        linking the track fragment for the object in the frame and the track fragment for the object in the one or more earlier frames to form a longer track fragment that is a track of the object; and for each object of the plurality of objects,
    transforming the track of the object to a common frame of reference to generate a common reference frame having the tracks of the plurality of objects mapped thereto; and
    outputting the video feed with the common reference frame and the mapped tracks of the plurality of objects as an overlay thereon.

2. The method of claim 1, wherein identifying the track fragment for the object in the one or more earlier frames includes identifying the track fragment in an instance in which a statistical variance between the kinematic, visual, temporal or machine learning-based feature and the corresponding kinematic, visual, temporal or machine learning-based feature is below a predetermined threshold.

3. The method of claim 1 further comprising maintaining a database of active track fragments including the track fragment for an object detected in the frame or in an earlier frame within a threshold number of frames, and a database of suspended track fragments including the track fragment for an object not detected in the frame or in an earlier frame within the threshold number of frames, and
    wherein identifying the track fragment for the object in the one or more earlier frames includes searching the database of active track fragments or the database of suspended track fragments to identify the track fragment for the object within the track fragments maintained therein.

4. The method of claim 3, wherein in an instance in which the track fragment for the object in the one or more earlier frames is identified in the database of suspended track fragments, identifying the track fragment for the object in the one or more earlier frames further includes moving the track fragment for the object in the one or more earlier frames from the database of suspended track fragments to the database of active track fragments, the track fragment for an object not detected in the frame or in an earlier frame within a second threshold number of frames being deleted from the database of suspended track fragments.

5. The method of claim 1, wherein sequentially processing each frame of the plurality of frames further includes assigning a unique identifier to the object in a first instance in which the object is detected,
    wherein identifying the kinematic, visual, temporal or machine learning-based feature of the object includes associating the kinematic, visual, temporal or machine learning-based feature with the unique identifier in the metadata associated with the track fragment to which the object is assigned, and wherein outputting the video feed includes generating corresponding workflow analytics for an object in the video feed, the workflow analytics being associated with the unique identifier of the object.

6. The method of claim 1, wherein the video feed includes a plurality of video feeds, and wherein receiving the video feed and sequentially processing each frame of the plurality of video frames includes receiving the video feed and sequentially processing each frame of the plurality of video frames for each of at least a first video feed and a second video feed, and in response to at least one object being detected in a frame of the first video feed and a frame of the second video feed, the method further comprising linking the track fragment for the object in the frame of the first video feed and the track fragment for the object in the frame of the second video feed.

7. The method of claim 1, wherein at least one frame of the plurality of frames includes an occlusion, and detecting the plurality of objects in the frame includes detecting at least one occluded object of the plurality of objects, and assigning the occluded object to a track fragment using computer vision, machine learning, and the catalog of kinematic, visual, temporal or machine learning-based features of identifiable objects.

8. An apparatus for automated object tracking in a video feed, the apparatus comprising a processor and a memory storing executable instructions that, in response to execution by the processor, cause the apparatus to at least:

receive a video feed including a plurality of frames;
sequentially process each frame of the plurality of frames, including at least:

detecting a plurality of objects in the frame, and for each object of the plurality of objects, assigning the object to a track fragment for the object in the frame, wherein the plurality of objects are detected and assigned using computer vision, machine learning, and a catalog of kinematic, visual, temporal or machine learning-based features of identifiable objects; and identifying a kinematic, visual, temporal or machine learning-based feature of the object, and storing the kinematic, visual, temporal or machine learning-based feature in metadata associated with the track fragment to which the object is assigned; and further for at least some of the plurality of frames, identifying a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames; and linking the track fragment for the object in the frame and the track fragment for the object in the one or more earlier frames to form a longer track fragment that is a track of the object; and for each object of the plurality of objects, transform the track of the object to a common frame of reference to generate a common reference frame having the tracks of the plurality of objects mapped thereto; and output the video feed with the common reference frame and the mapped tracks of the plurality of objects as an overlay thereon.

9. The apparatus of claim 8, wherein the apparatus identifying the track fragment for the object in the one or more earlier frames includes identifying the track fragment in an instance in which a statistical variance between the kinematic, visual, temporal or machine learning-based feature and the corresponding kinematic, visual, temporal or machine learning-based feature is below a predetermined threshold.

10. The apparatus of claim 8, wherein the memory stores executable instructions that, in response to execution by the processor, cause the apparatus to further maintain a database of active track fragments including the track fragment for any object detected in the frame or in an earlier frame within a threshold number of frames, and a database of suspended track fragments including the track fragment for any object not detected in the frame or in an earlier frame within the threshold number of frames, and wherein the apparatus identifying the track fragment for the object in the one or more earlier frames includes searching the database of active track fragments or the database of suspended track fragments to identify the track fragment for the object within the track fragments maintained therein.

11. The apparatus of claim 10, wherein in an instance in which the track fragment for the object in the one or more earlier frames is identified in the database of suspended track fragments, the apparatus identifying the track fragment for the object in the one or more earlier frames further includes moving the track fragment for the object in the one or more earlier frames from the database of suspended track fragments to the database of active track fragments, the track fragment for any object not detected in the frame or in an earlier frame within a second threshold number of frames being deleted from the database of suspended track fragments.

12. The apparatus of claim 8, wherein the apparatus being caused to sequentially process each frame of the plurality of frames further includes assigning a unique identifier to the object in a first instance in which the object is detected, wherein the apparatus identifying the kinematic, visual, temporal or machine learning-based feature of the object includes associating the kinematic, visual, temporal or machine learning-based feature with the unique identifier in the metadata associated with the track fragment to which the object is assigned, and wherein the apparatus being caused to output the video feed includes generating corresponding workflow analytics for an object in the video feed, the workflow analytics being associated with the unique identifier of the object.

13. The apparatus of claim 8, wherein the video feed includes a plurality of video feeds, and wherein the apparatus being caused to receive the video feed and sequentially process each frame of the plurality of video frames includes receiving the video feed and sequentially process each frame of the plurality of video frames for each of at least a first video feed and a second video feed, and in response to at least one object being detected in a frame of the first video feed and a frame of the second video feed, the apparatus further linking the track fragment for the object in the frame of the first video feed and the track fragment for the object in the frame of the second video feed.

14. The apparatus of claim 8, wherein at least one frame of the plurality of frames includes an occlusion, and the apparatus detecting the plurality of objects in the frame includes detecting at least one occluded object of the plurality of objects, and assigning the occluded object to a track fragment using computer vision, machine learning, and the catalog of kinematic, visual, temporal or machine learning-based features of identifiable objects.

15. A computer-readable storage medium for automated object tracking in a video feed, the computer-readable storage medium having computer-readable program code stored therein that, in response to execution by a processor, causes an apparatus to at least:

receive a video feed including a plurality of frames;

sequentially process each frame of the plurality of frames, including the apparatus being caused to at least:

detect a plurality of objects in the frame, and for each object of the plurality of object, assign the object to a track fragment for the object in the frame, wherein the plurality of objects are detected and assigned using computer vision, machine learning, and a catalog of kinematic, visual, temporal or machine learning-based features of identifiable objects; and identify a kinematic, visual, temporal or machine learning-based feature of the object, and store the kinematic, visual, temporal or machine learning-based feature in metadata associated with the track fragment to which the object is assigned; and further for at least some of the plurality of frames, identify a track fragment for the object in one or more earlier frames based on a comparison of the kinematic, visual, temporal or machine learning-based feature of the object and a corresponding kinematic, visual, temporal or machine learning-based feature in metadata associated with the track fragment for the object in the one or more earlier frames; and link the track fragment for the object in the frame and the track fragment for the object in the one or more earlier frames to form a longer track fragment that is a track of the object; and for each object of the plurality of objects, transform the track of the object to a common frame of reference to generate a common reference frame having the tracks of the plurality of objects mapped thereto; and output the video feed with the common reference frame and the mapped tracks of the plurality of objects as an overlay thereon.

16. The computer-readable storage medium of claim 15, wherein the apparatus being caused to identify the track fragment for the object in the one or more earlier frames includes being caused to identify the track fragment in an instance in which a statistical variance between the kinematic, visual, temporal or machine learning-based feature and the corresponding kinematic, visual, temporal or machine learning-based feature is below a predetermined threshold.

17. The computer-readable storage medium of claim 15 having computer-readable program code stored therein that, in response to execution by a processor, causes the apparatus to further maintain a database of active track fragments including the track fragment for an object detected in the frame or in an earlier frame within a threshold number of frames, and a database of suspended track fragments including the track fragment for an object not detected in the frame or in an earlier frame within the threshold number of frames, and wherein the apparatus being caused to identify the track fragment for the object in the one or more earlier frames includes being caused to search the database of active track fragments or the database of suspended track fragments to identify the track fragment for the object within the track fragments maintained therein.

18. The computer-readable storage medium of claim 17, wherein in an instance in which the track fragment for the object in the one or more earlier frames is identified in the database of suspended track fragments, the apparatus being caused to identify the track fragment for the object in the one or more earlier frames further includes being caused to move the track fragment for the object in the one or more earlier frames from the database of suspended track fragments to the database of active track fragments, the track fragment for any object not detected in the frame or in an earlier frame within a second threshold number of frames being deleted from the database of suspended track fragments.

19. The computer-readable storage medium of claim 15, wherein the apparatus being caused to sequentially process each frame of the plurality of frames further includes being caused to assign a unique identifier to the object in a first instance in which the object is detected, wherein the apparatus being caused to identify the kinematic, visual, temporal or machine learning-based feature of the object includes being caused to associate the kinematic, visual, temporal or machine learning-based feature with the unique identifier in the metadata associated with the track fragment to which the object is assigned, and wherein the apparatus being caused to output the video feed includes being caused to generate corresponding workflow analytics for the object, the workflow analytics being associated with the unique identifier.

20. The computer-readable storage medium of claim 15, wherein the video feed includes a plurality of video feeds, and wherein the apparatus being caused to receive the video feed and sequentially process each frame of the plurality of video frames includes being caused to receive the video feed and sequentially process each frame of the plurality of video frames for each of at least a first video feed and a second video feed, and in response to at least one object being detected in a frame of the first video feed and a frame of the second video feed, the apparatus being caused to further link the track fragment for the object in the frame of the first video feed and the track fragment for the object in the frame of the second video feed.

21. The computer-readable storage medium of claim 20, wherein at least one frame of the plurality of frames includes an occlusion, and the apparatus being caused to detect the plurality of objects in the frame includes being caused to detect at least one occluded object of the plurality of objects, and assign the occluded object to a track fragment using computer vision, machine learning, and the catalog of kinematic, visual, temporal or machine learning-based features of identifiable objects.

* * * * *